Patented Dec. 2, 1941

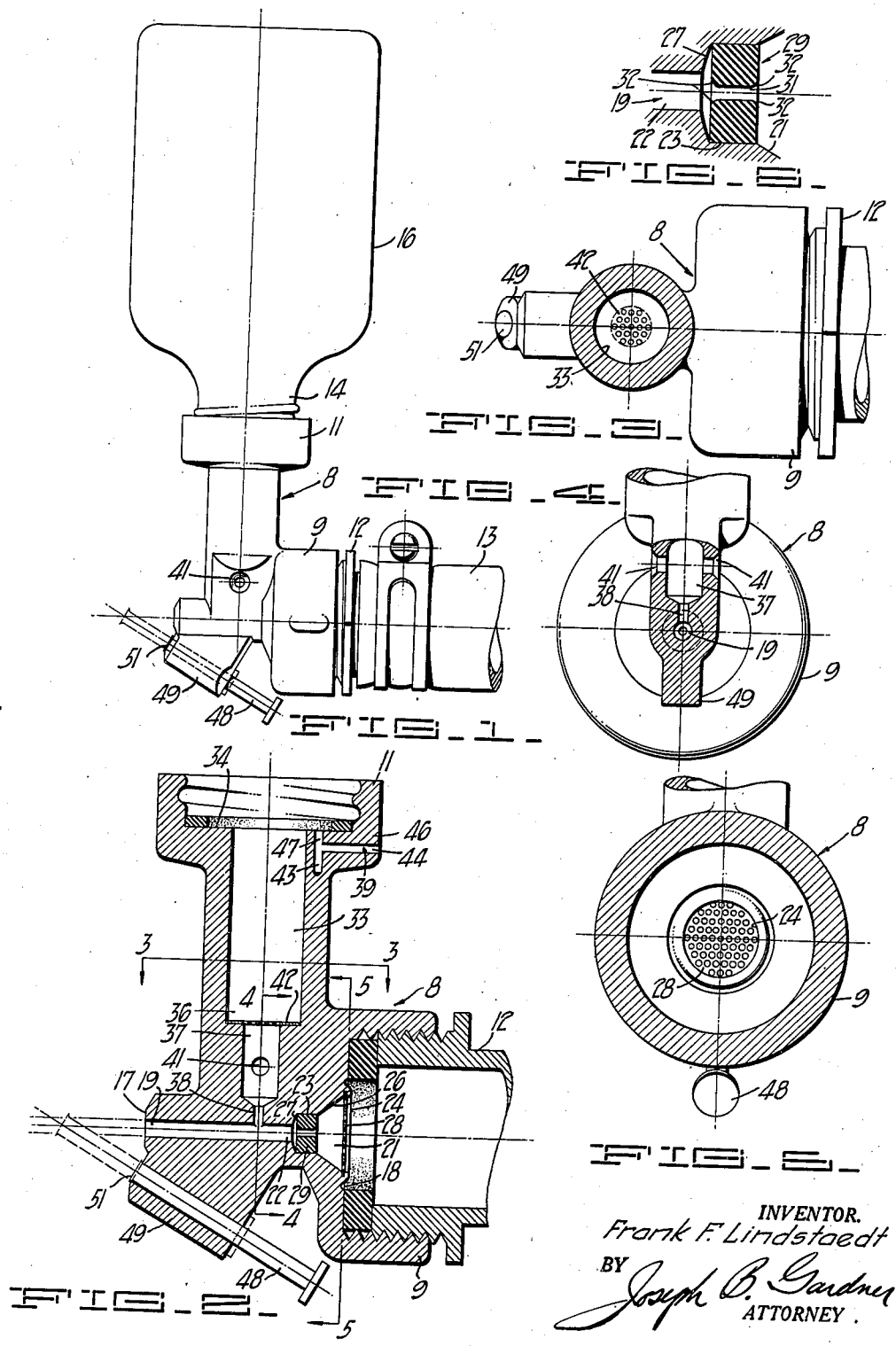

2,264,539

UNITED STATES PATENT OFFICE 2,264,539

SPRAY APPARATUS

Frank F. Lindstaedt, San Francisco, Calif.

Application January 4, 1939, Serial No. 249,211

5 Claims. (Cl. 299—84)

The invention relates to spray apparatus and particularly to small sized horticultural sprayers of the type customarily used for spraying gardens, shrubs, lawns and the like such as disclosed and claimed in my copending application, Serial No. 100,836, filed September 15, 1936. The present application forms a continuation-in-part of said copending application.

The present spray apparatus is adapted for use with a concentrated spray liquid and a suitable carrier fluid such as water, which are both supplied to the apparatus and which are appropriately mixed and sprayed therefrom. As pointed out in my copending application aforesaid, the apparatus is particularly adapted for use with a water carrier fluid such as obtained from city mains by way of a common type garden hose, and as also described in said copending application, the water compressor in such mains varies widely for different cities and different localities in certain cities, and even at different periods of the day in the same locality, and due to such non-uniformity of pressure a problem has arisen to maintain uniform output characteristics of the sprayer. This problem has been overcome by the invention set forth in my copending application by the use of suitable means for automatically regulating the fluid flow through the apparatus for various pressures, whereby a substantially constant and uniform discharge of spray material is obtained, regardless of the applied pressure throughout a wide range of pressures. A substantially similar automatic control mechanism is used in the present structure. However, certain features of the construction have been changed and improved. It will, therefore, be understood that the present invention consists mainly in such improvements in constructional features rather than to the sprayer as a whole new combination. Among other features, the present structure provides improvements in the pressure responsive fluid regulator, and the hydrostatic or gravity spray concentrate feed to the discharge passage of the sprayer, whereby an improvement is made in the uniformity and constancy of performance of these two coacting major parts of the sprayer.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation of a spray apparatus constructed in accordance with the present invention, and is shown operatively connected to a garden hose and a container for spray material.

Figure 2 is an enlarged vertical sectional view of the spray apparatus illustrated in Figure 1.

Figure 3 is a horizontal sectional view of the spray apparatus taken substantially on the plane of line 3—3 of Figure 2.

Figure 4 is a vertical cross-sectional view taken substantially on the plane of line 4—4 of Figure 2.

Figure 5 is a vertical sectional view taken substantially on the plane of line 5—5 of Figure 2.

Figure 6 is an enlarged vertical sectional view of a part of the spray apparatus including the pressure regulator.

The spray apparatus of the present invention comprises briefly a body adapted for connection to a source of concentrated spray material and to a source of carrier fluid under pressure and provides for the mixing of the spray material and the carrier fluid and the discharging of the mixture from the body for horticultural spraying. In accordance with the present invention, means is provided in the carrier fluid passage for automatically regulating the fluid flow so as to make such flow uniform for substantially all applied pressures and also means is provided for supplying the spray material to the carrier fluid at a constant rate, regardless of the pressure or velocity of the carrier fluid. In this manner with both the fluids carefully controlled as to flow, an accurate control is maintained over the character and density of the spray mixture discharged.

With reference more particularly to the accompanying drawing, the spray apparatus comprises a body 8, preferably of metal or other material suitable for casting and which forms a sprayer head for the apparatus. Means of connection of the spray material and the carrier fluid to the body here includes threaded sockets or receiving portions 9 and 11 adapted respectively for the receipt of one end 12 of a garden hose 13, and a threaded open neck portion 14 of a bottle or other container 16 for spray material. Formed in the body and extending to the front end 17 thereof from a point forwardly of the base 18 of the socket 9, is a discharge passage 19, to which the carrier liquid and the spray material are jointly fed. Means of connection between the socket 9 and the discharge passage 19 here includes a passageway 21 which extends forwardly and centrally from the base 18 of the socket into registration with the rear end 22 of the passage 19. Preferably, the passage 19 and the socket 9 and the connecting passageway 21 are axially aligned and in accordance with the present construction, the passageway 21 tapers forwardly from the socket to a reduced cylindrical portion 23 at the rear end 22 of the passage 19. As here shown, the rear open end 24 of the passageway at the base of the socket 9, is of substantially smaller diameter than the socket and the side 26 of the passageway extending forwardly from the end 24 converges to the cylindrical portion 23. This latter portion is of somewhat larger diameter than that of the passage 19, whereby a shoulder or wall 27 is provided at the forward end of the portion 23. A screen 28 is preferably mounted across the open end 24 of the passageway so as to sift the carrier fluid passing through the apparatus.

In accordance with the present arrangement, there is mounted in the cylindrical portion 23 aforesaid a pressure regulator 29 (see Figures 2 and 6) which is operative to maintain a constant fluid flow into the discharge passage 19 for substantially all applied fluid pressures. This member is here shown in the form of a cylindrical plug of relatively soft compressible material, such as rubber or synthetic rubber as "neoprene," and is provided with an axial bore 31 therethrough aligned with the passageway and the discharge passage 19. The pressure regulator 29 is operable as described generally in my copending application, to expand and contract the passage 31 in accordance with the applied pressure, so that at greater applied pressures the passageway is smaller than at smaller applied pressures, whereby the passage area is successively reduced with increased pressure applied.

The present regulator has been designed to maintain a constant flow of carrier fluid for all applied water pressures from approximately forty to one hundred and fifty pounds per square inch, and particularly to maintain such constant flow in the higher pressure ranges. One difficulty encountered in the making of such a pressure regulator is the tendency of the regulator to choke off too much at higher pressures. This tendency of the regulator has been overcome in the present construction by beveling or rounding the front and rear edges 32 of the regulator passage 31 (see Figure 6) so as to remove any sharp edges at the ends of the passage which have a tendency to cut off the passage at high pressures, and by also forming the end wall 27 of the regulator seat 23 slightly concave so as to enable a small longitudinal expansion of the regulator at higher pressures. This latter longitudinal expansion, as will be understood, also enables a slight opening up of the forward end of the passage 31.

The concentrated spray material passes from the socket 11 into a receiving chamber 33 which has a substantially large cross-sectional area and extends axially from the base 34 of the socket. The chamber 33, as here shown, is of cylindrical elongated form, and is connected at its lower end 36 of a second receiving chamber 37 which extends from the end 36 of the chamber 33 to adjacent the passage 19 and is connected to the latter passage by way of a reduced port 38. Air is admitted to the base of the socket 11 by way of air passage 39, so that the height of the liquid below the base of the socket forms a constant gravity or hydrostatic head for inducing the flow of spray liquid into the passage 19. In order that the pressure or velocity of the carrier fluid passing through the discharge passage 19 will not affect the flow of spray material, the chamber 37 is vented to the atmosphere by way of a pair of air openings 41, whereby any reduced pressure in the passage 38 will not be felt above the openings 41. In accordance with the present arrangement, the openings 41 are provided substantially centrally of the height of the chamber 37 so as to substantially maintain this entire chamber 37 at atmospheric pressure. In this manner the substantial height of the liquid column inducing the gravity or hydrostatic flow of the spray material is that confined to the height of the chamber 33.

As an important feature of the present construction, I have found that the liquid may be best transferred from the chamber 33 into the chamber 37 by breaking the liquid up into droplets by means of a screen 42 placed across the lower end 36 of the chamber 33. This screen may be constructed either of wire, or as here shown, as a perforated plate. By the use of such a screen, the liquid will flow from chamber 33 into chamber 37 constantly, evenly and smoothly, and substantially all surges of spray material flow to the discharge passage is eliminated. Furthermore, the use of the screen 42 enables a precise metering of the spray liquid flow, for as will be understood, in the present apparatus the liquid head and the flow orifice are both under control. Also the venting of chamber 37 to the atmosphere by means of the opening 41 located below the screen 42 insures the maintenance of atmospheric pressure at both the top and bottom of the liquid column in the chamber 33, whereby an absolutely constant flow may be maintained.

As will be understood, the apparatus is placed into and out of operation by rotating the device into and out of an inverted position of the container 16. In such an inverted position of the container the liquid will flow into the chamber 33 while air is drawn through the passage 39 into the liquid container. The passage 39 is preferably of substantially capillary dimension while that of the chamber is as above noted, of many times greater area so that a naturally induced flow of liquid into the chamber and air up into the container is insured. When the apparatus is first rotated to invert the container, however, it sometimes happens that the impact of the liquid in the container into the socket 11 will cause some liquid to penetrate into the passage 39. If this liquid should plug the passage, the apparatus will not properly start until after such liquid has been removed by the incoming air, and in some instances and constructions heretofore, the liquid would even pass completely through the air passage to the exterior of the device. To prevent such a clogging of the air passage and possible dripping of spray material from the air passage, I have provided the air passage with a right-angled bend and also with a liquid sump 43 whereby any liquid entering the passage from the socket 11 will pass into the sump 43 and keep the passage clear. This structure is here provided by forming the passage 39 with a horizontal portion 44 which extends to an outer side 46 of the socket and which is joined at its inner end to a vertical portion 47 extending to the base 34 of the socket. The vertical portion 47 is here extended beyond the horizontal portion 44 so as to define the sump 43 aforesaid.

Preferably, I embody in the spray apparatus means for selectively controlling the character and consistency of the spray discharged. This means here consists of a deflector 48 which is reciprocally carried by a portion 49 of the sprayer body for selective positioning of one end 51 into the stream of liquid being discharged from the passage 19 at the front end 17 of the apparatus. This deflector has been more fully described and claimed in my copending application, Serial No. 249,212, filed Jan. 4, 1939.

I claim:

1. A spray apparatus comprising, a body having a spray discharge passage adapted for connection to a source of carrier fluid under pressure, said body having a socket for the receipt of the open end of a container for spray liquid concentrate and arranged in the operable position of said apparatus with said socket elevated over said passage, a liquid receiving chamber extending from said socket towards said passage, a passageway communicating the base of said chamber with said passage, atmospheric air inlet means connected to said socket adjacent the top of said chamber, atmospheric air inlet means connected to said passageway for maintaining at least a part of said passageway at substantially atmospheric pressure, and a screen mounted across the base of said chamber for passing the liquid concentrate to said passageway part in droplet form.

2. A spray apparatus comprising, a body having a spray discharge passage adapted for connection to a source of carrier fluid under pressure, said body having a socket for the receipt of the open end of a container for spray liquid concentrate and arranged with said socket elevated over said passage, a liquid receiving chamber communicated with and extending downwardly from said socket towards said passage in the operable position of said apparatus, a second liquid receiving chamber extending from the lower end of said first chamber and having a smaller passage area than said first chamber, a passage connecting the lower end of said second chamber to said first passage and having a passage area reduced from said second chamber, a screen mounted at the lower end of said first chamber and across the upper end of said second chamber, and air inlet means connected to said socket adjacent the top of said first chamber and connected to said second chamber intermediate said screen and second passage.

3. A spray apparatus of the character set out in claim 2, wherein said air inlet means comprises in part a plurality of air holes extending through said body from the exterior thereof to said second chamber substantially at the center of the height thereof.

4. A spray apparatus comprising, a body having a spray discharge passage adapted for connection to a source of carrier fluid under pressure, said body having a socket for the receipt of the open end of a container for spray liquid concentrate and arranged in the operable position of said apparatus with said socket elevated over said passage, a liquid receiving chamber communicated with and extending downwardly from said socket towards said passage in the operable position of said apparatus, a passageway communicating the base of said chamber with said passage, and air inlet means connected to said socket adjacent the top of said chamber and comprising a passage having a substantially horizontal portion extending through said body to the exterior thereof and a substantially right-angled vertical portion extending to the base of said socket.

5. A spray apparatus comprising, a body having a spray discharge passage adapted for connection to a source of carrier fluid under pressure, said body having a socket for the receipt of the open end of a container for spray liquid concentrate and arranged in the operable position of said apparatus with said socket elevated over said passage, a liquid receiving chamber communicated with and extending downwardly from said socket towards said passage in the operable position of said apparatus, a passageway communicating the base of said chamber with said passage, and air inlet means connected to said socket adjacent the top of said chamber and comprising a passage having a substantially horizontal portion extending through said body to the exterior thereof and a substantially right-angled vertical portion extending to the base of said socket, said last named passage portion extending below said horizontal portion and providing a liquid sump.

FRANK F. LINDSTAEDT.